United States Patent [19]

Melbye

[11] Patent Number: 4,584,220
[45] Date of Patent: Apr. 22, 1986

[54] LAMINATED TAPE

[75] Inventor: Kenneth M. Melbye, Stillwater, Minn.

[73] Assignee: Kroy Inc., Scottsdale, Ariz.

[21] Appl. No.: 339,481

[22] Filed: Jan. 15, 1982

[51] Int. Cl.[4] .............................................. A61F 13/02
[52] U.S. Cl. ................... 428/42; 428/423.7; 428/423.1; 428/352; 428/468; 428/914
[58] Field of Search .................. 428/423.1, 914, 423.7, 428/41, 42, 40, 352; 101/468

[56] References Cited

U.S. PATENT DOCUMENTS

| | | | |
|---|---|---|---|
| 3,166,186 | 1/1965 | Karn | 428/42 |
| 3,930,092 | 12/1975 | Shapiro et al. | 101/468 |
| 4,364,885 | 12/1982 | Kanai et al. | 428/423.7 |
| 4,374,883 | 2/1983 | Winslow | 428/423.7 |

FOREIGN PATENT DOCUMENTS

| | | | |
|---|---|---|---|
| 1263474 | 7/1962 | Fed. Rep. of Germany | 428/42 |
| 842983 | 8/1960 | United Kingdom | 428/42 |

Primary Examiner—Edith Buffalow
Attorney, Agent, or Firm—Dorsey & Whitney

[57] ABSTRACT

A laminated tape for manufacturing figures of desired shape comprising a first film layer of a relatively soft and flexible material capable of being cut by an elongated cutting ridge of a cutting die and a second film layer disposed in face-to-face relationship with respect to the first film layer for supporting the first film layer. The first film layer is constructed of a material having tensile strength of no greater than about 1000 pounds per square inch.

11 Claims, 12 Drawing Figures

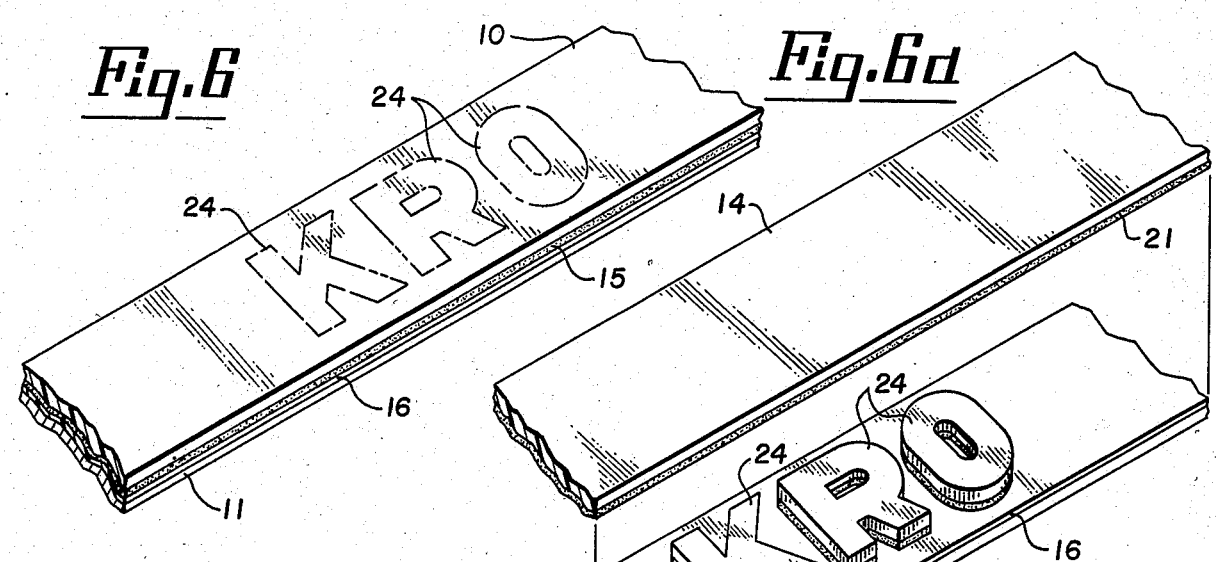
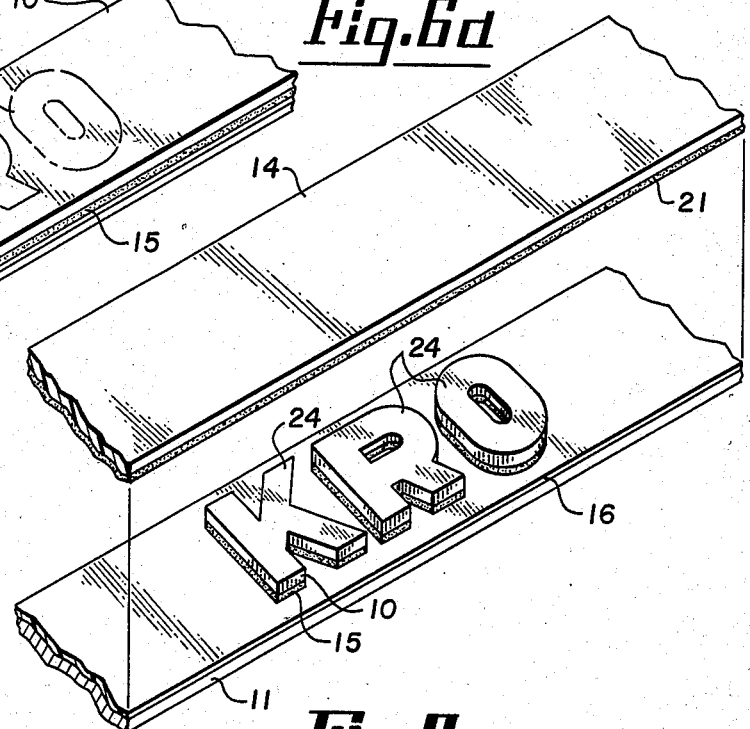
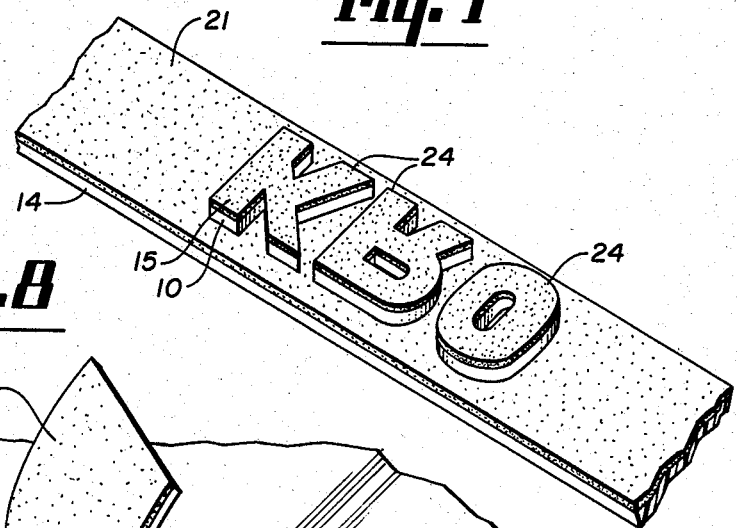
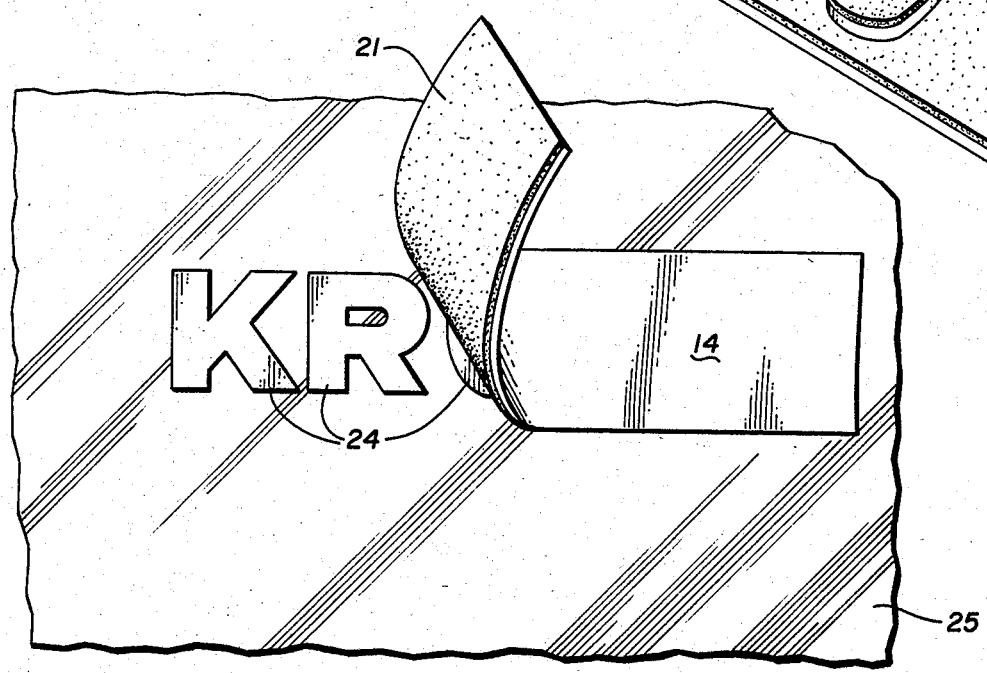

LAMINATED TAPE

BACKGROUND OF THE INVENTION

The present invention relates generally to a laminated type and more particularly to a laminated tape usable in connection with the manufacture of figures or characters of desired shape or the stencils for such figures or characters. The present invention also relates to a method of using such laminated tape in the manufacture of such figures or characters and application of the same to the desired medium.

Various devices and techniques presently exist in the prior art for cutting letters or figures of other shapes and transferring the same to a desired medium. Prior art also exists in which a laminated tape includes a top layer adapted to transmit a cutting force from a cutting die to a cuttable intermediate layer and a bottom base layer. Such a laminated tape is described in the Massari U.S. Pat. No. 3,558,425. The laminated tape described in this patent includes an upper, relatively thin and highly flexible carrier layer which stretches and serves to transmit the cutting force of a cutting die to an intermediate layer. This intermediate layer is positioned below the upper layer and is a highly inflexible and hard material such as cellulose acetate which is susceptible of being cut by the cutting forces transmitted through the upper layer. A bottom layer of this laminated tape consists of a relatively hard material. Although the laminated tape of the above-mentioned Massari patent is satisfactory in many respects, its usefulness is limited because of the relatively high cutting force needed to cut the intermediate layer. This high cutting force is a direct result of the highly inflexible and hard intermediate layer required in the Massari laminated tape structure. The high cutting forces in turn necessitate the use of generally hard cutting materials such as steel, thus dramatically increasing the cost of the cutting equipment and thereby limiting the potential use of the laminated tape. Accordingly, a need has existed, and continues to exist, for a laminated tape structure having a cuttable layer with the toughness and strength to resist tearing, etc. during manufacture or use as well as being soft and flexible enough to dramatically reduce the cutting forces needed to manufacture the figure of desired shape. Such a laminated tape would eliminate the necessity for relatively hard cutting materials such as steel and thereby significantly reduce the cost of the cutting equipment and increase the use of the laminated tape.

SUMMARY OF THE INVENTION

The present invention relates to a laminated tape for manufacturing figures or characters of a desired shape having a first film layer comprised of a relatively soft and flexible material. This material has properties which enable it to be cut by a cutting die in which the cutting force is significantly less than the forces which have heretofore been required in the prior art. A second film layer is disposed adjacent to the first layer to carry and provide support for the first layer during the cutting process. In the preferred embodiment, the first layer includes an adhesive material on the surface adjacent to the second layer so that the figures or characters, after they are cut, can be removed and applied to the desired medium.

Although the structure of the laminated film of the present invention is similar in some respects to the laminated tape structure described in the Massari patent mentioned above, the composition and physical characteristics of the first layer susceptible to being cut is dramatically different. In fact, the physical characteristics of the cuttable first layer of the present invention are virtually opposite that of the cuttable layer in the Massari structure. For example, the Massari intermediate layer is defined as being hard, brittle and highly inflexible. In contrast, the cuttable first layer of the present invention is very soft, elastic and highly flexible material. In the preferred embodiment, it has been found that a first film layer constructed of polyurethane material provides the desired physical characteristics.

In one embodiment of the present invention, a third or transfer film layer is disposed adjacent to the second layer on the side opposite that of the first layer. This third layer can be constructed of a variety of materials; however, it includes one surface which has a relatively low tack adhesive. Preferably, this surface is adjacent to the second layer. The function of this third or transfer layer is to facilitate the separation of the cut figures from the background portion of the first layer and to appropriately position said figures for placement on the desired medium.

In a second embodiment of the present invention, this third or transfer layer is not supplied adjacent to the second layer, but is supplied separately and preferably in roll form. Similar to the third layer supplied adjacent to the second layer, this material supplied in roll form includes one surface with a relatively low tack adhesive for facilitating the removal of the cut figures or characters from the first layer and for positioning the same with respect to the desired medium.

In a still further embodiment of the present invention, this third layer is disposed adjacent the first layer on the side opposite the second layer so that the cutting force of the cutting dies is transmitted through this third layer before cutting the figures from the first layer.

The method of using the laminated tape of the present invention includes cutting the figure of desired shape in the first layer of the tape, placing a length of the third layer or transfer tape over the cut figures, removing the cut figures from the first layer and applying the same to the desired medium.

Accordingly, a primary object of the present invention is to provide a laminated tape for manufacturing figures of desired shape in which the cuttable layer is a material which requires dramatically less cutting force than the laminated tape structures of the prior art.

Another object of the present invention is to provide an improved laminated tape for manufacturing figures of desired shape in which the layer susceptible of being cut is a soft and highly flexible material such as a polyurethane.

A further object of the present invention is to provide an improved laminated tape having a first cuttable layer and a second support layer and which futher includes a third layer provided either adjacent to the support layer or supplied separately to facilitate the removal of the cut figures from the first layer and to position the same with respect to the desired medium.

A still further object of the present invention is to provide an improved method for manufacturing figures of desired shape from a laminated film and applying the same to a desired medium.

Another object of the present invention is to provide an improved laminated tape having a soft and highly flexible layer and usable in the manufacture of stencils.

These and other objects of the present invention will become apparent with reference to the drawings, the description of the preferred embodiment and the appended claims.

DESCRIPTION OF THE DRAWINGS

FIG. 6 is a pictorial view showing the laminated tape with the characters having been cut from the top layer.

FIG. 6a is a pictorial view showing the transfer tape in position to remove the cut-out characters from the laminated tape.

FIG. 7 is a pictorial view showing the cut out figures after having been transferred to the transfer tape.

FIG. 8 is a pictorial view showing the method of applying the cut out figures to the desired medium.

DESCRIPTION OF THE PREFERRED EMBODIMENT

Figure 1:
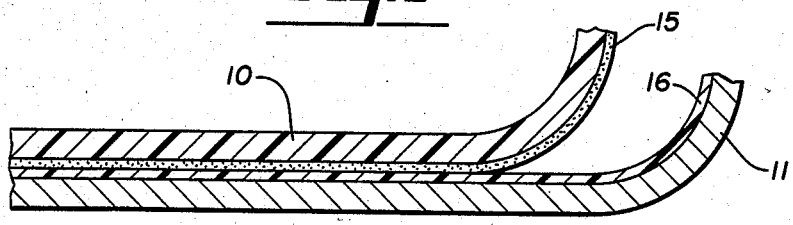
FIG. 1 is a sectional view showing one embodiment of the laminated tape of the present invention.
Figure 2:
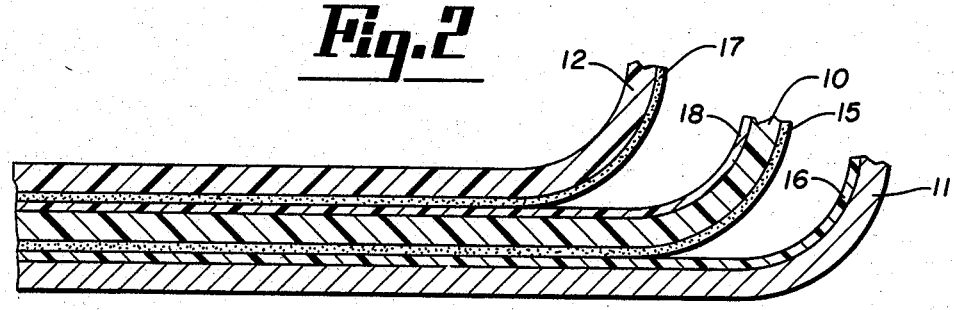
FIG. 2 is a sectional view showing an alternate embodiment of the laminated tape of the present invention.

Reference is first made to FIGS. 1–4 showing various embodiments of the laminated tape of the present invention. Although these embodiments illustrate various combinations of laminated structures, they all include a first film layer 10 comprised of a relatively soft and highly flexible material capable of being cut by a cutting ridge of a cutting die. Each of these embodiments also includes a second film layer 11 functioning to support or carry the first layer 10. This second layer 11 is nut cut during the cutting procedure. Each of the embodiments of FIGS. 1–4 also includes a third film layer functioning as a transfer tape to transfer the cut out figures from the first layer 10 to a desired medium. In the embodiment of FIG. 2, this third layer is designated by the reference numeral 12, whereas in the embodiments of FIGS. 3 and 4, this third layer is designated by the reference numeral 13. With respect to the embodiment of FIG. 1, the third layer is supplied separately from the roll of transfer tape 22 illustrated in FIG. 5. The transfer tape itself is designated by the reference numeral 14.

As will be described in greater detail below, the first layer 10 of each of the embodiments illustrated in FIGS. 1–4 is capable of being cut by an elongated cutting ridge of a cutting die. In general, the physical characteristics of this first layer 10 is that it is a relatively soft and flexible material. Although it is contemplated that various types of synthetic polymers such as epoxys, acrylics, vinyls and polyesters may be formulated so that they exhibit the desired physical characteristics of the first layer 10, the first layer 10 of the preferred embodiment is constructed of a low energy, cuttable polyurethane. It has been found, through testing and experimentation, that a first layer constructed of such a polyurethane provides the desired physical properties of softness and flexibility and provides a material which is capable of being cut at dramatically lower cutting forces than is needed in prior art devices.

Figure 11:
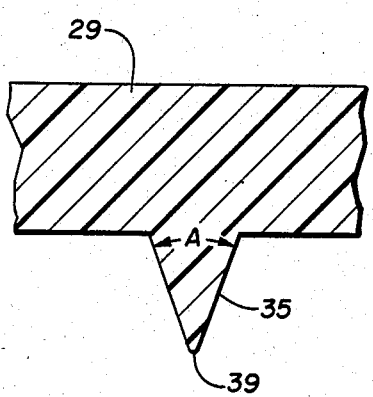
FIG. 11 is a sectional view of a portion of the lettering chip as viewed along the section line 11—11 of FIG. 10.

One of the primary advantages of the softness and flexibility of the first layer 10 is that it is cuttable with a relatively low force by a cutting ridge of a cutting die. The particular magnitude of this cutting force is one parameter which has been used by the inventor to define the desired characteristics of the first layer 10. A second parameter used is that of tensile strength, namely, the force needed to fracture a piece of the material by pulling two ends of the material in opposite directions. During the development of the present invention, a test was devised to determine the force needed to cut through a particular layer of material. This test was performed using a Model QC Electronic Tensile Tester manufactured by Thwing-Albert Instrument Company of Philadelphia, Pa. This device was provided with a 500 pound load cell and a compression fixture to enable a compression cutting force to be exerted. A cutting die similar to the lettering chip 29 illustrated in FIG. 10 was also utilized. Such cutting die included a continuous cutting ridge 35 of finite length. As illustrated in FIG. 11, the generally wedge shaped continuous cutting ridge 35 includes a cutting point or edge 39 and a pair of side surfaces disposed at an included angle "A" with respect to each other of approximately fifty degrees (50°). In the test apparatus, the lettering chip 29 and cutting ridge 35 was constructed of a high impact molded plastic designated as Plexiglass DR 61K and manufactured by Rohm & Haas Company of Philadelphia, Pa. A urethane pad of Hardness 61–64 Shore C was provided to resist the cutting force. The testing device further included means for applying and recording a given force to the cutting die.

Samples of various materials and polymer formulations were then inserted into the compression test fixture between the cutting ridge of the cutting die and the urethane pad and a cutting force was applied until the material had been cut. The force at which a 100% cut occurred was recorded and a force per linear inch of the cutting ridge was calculated. As a result of these force tests, it was determined that to obtain the advantages of the present invention and to exhibit the necessary and desired characteristics of softness and flexibility, the first film layer 10 had to be constructed of a material which could be cut by a cutting force of no greater than about 250 pounds per linear inch of cutting ridge. It is also contemplated that the first layer 10 should be at least about one mil (0.001 inches) thick. Materials greater than the above thickness which require a cutting force greater than 250 pounds per linear inch, such as the cellulose acetate and materials having similar properties disclosed in the Massari U.S. Pat. No. 3,558,425, do not provide the desired benefits since those materials require significantly different and more expensive types of cutting apparatus to cut the first layer 10. When the above test was applied to a piece of cellulose acetate 0.95 mil (0.00095 inches) thick, the testing apparatus which had a maximum load capability of 500 pounds, could not cut the sample. Thus, the cutting force needed for this sample of cellulose acetate was substantially greater than 500 pounds per linear inch. Obviously, cellulose acetate or similar material with a thickness greater than one mil (0.001 inch) would require still greater cutting forces. Preferably, the first film layer 10 is constructed of a material which can be cut by a cutting force of between about 125 and 175 pounds per linear inch of cutting ridge.

The inventor has also determined that the tensile strength of a particular material is generally linearly related to the cutting force determined in the test described above. Tensile strength of a material is conventionally determined by The American Society for Testing and Materials (ASTM) test D882. In this test, stress is applied to a material in a pulling fashion until it breaks. Tensile strength is calculated by dividing the maximum load (force) by the original cross-sectional area of the sample. The result is expressed in pounds per square inch.

Tensile strength determinations were made on various materials and formulations which confirmed the generally linear relationship between tensile strength and cutting force. While this generally linear relationship is expected to vary somewhat for different kinds and formulations of material, it was determined that the tensile strength of the material from which the first layer is constructed should be no greater than about 1000 pounds per square inch and preferably no greater than about 500 pounds per square inch. Tensile strength determinations conducted with respect to a sample of cellulose acetate 0.95 mils (0.00095 inches) thick resulted in a tensile strength of about 10,000 p.s.i.

Accordingly, to achieve the benefits and advantages of the present invention, the first layer 10 which is cuttable must be constructed of a material which is relatively soft and flexible and capable of being cut by an elongated cutting ridge of a cutting die. Further, the material of the first layer 10 should have a tensile strength of no greater than 1000 pounds per square inch. The material should also be such that a cutting force of no more than about 250 pounds per linear inch of the cutting ridge will cut the first layer 10. Preferably the first layer 10 should also be at least one mil (0.001 inch) thick.

As indicated above, the first film layer 10 of the preferred embodiment is a urethane film formed by reacting an isocyanate monomer with one or more polyols. Specifically, the isocyanate monomer is a hexamethylene diisocyanate having an isocyanate equivalent weight of about 190. The preferred polyols include a polymeric vinyl ester acrylic copolymer (40% solids) with a hydroxyl equivalent weight of about 400; a hydroxyl functional acrylic copolymer with a hydroxyl equivalent weight of about 800; a saturated polyester resin with a hydroxyl equivalent weight of about 1135; DB castor oil having a hydroxyl value of about 164; and a polyoxypropylene polyether having a hydroxyl equivalent weight of about 125. A catalyst such as organo tin and pigments are also added in the preferred system. Preferably, the index or ratio of isocyanate equivalence to hydroxyl equivalence is about 0.7 to 0.9 with the optimum being about 0.8.

With reference again to FIGS. 1–4, a second layer 11 is disposed adjacent to and in face-to-face relationship with one surface of the first layer 10. The physical properties of this second layer 11 are not as important as the properties of the first layer 10 since its primary function is to provide support for and carry the first layer 10 during the cutting procedure. Accordingly, the second layer 11 can be constructed of a variety of materials such as materials having a paper base or polymer films such as polyesters or polyethylenes. Also, in general, the second layer 11 should be relatively hard and inflexible compared to the first layer 10 and should also be relatively non-elastic, to preclude the laminated film from being stretched and deformed prior or subsequent to the cutting procedure. In comparison to the first layer 10, the second layer 11 should have a tensile strength greater than 1000 pounds per square inch. Also, the second layer 11 should not be capable of being cut by a cutting ridge at cutting forces less than 250 pounds per linear inch.

As illustrated, the lower surface of the first layer 10 which is adjacent to the second layer 11 is provided with an adhesive coating 15. The corresponding surface of the second layer 11 is provided with a release liner or coating 16 to permit portions of the first layer 10 to be removed or stripped from the second layer 11 when desired. Following removal, as will be described in greater detail below, these portions of the first layer 10 are positioned onto the desired medium and retained in such position by the adhesive coating 15. Accordingly, the adhesive coating 15 should be quite aggressive. In the preferred embodiment, the adhesive 15 is a generally available hot melt acrylic or water base adhesive. The specific tack or aggressiveness of the adhesive is measured by a peel test which involves placing a one-half inch wide strip of material backed with the particular adhesive in question on a substrate consisting of 1000 H Vellum drafting stock. After applying the strip with a four pound roller and waiting fifteen minutes, one end of the strip is then gripped and peeled back at 180°. The force needed to accomplish this peel is indicative of the tack or aggressiveness of the adhesive. Using this test, the preferred tack of the adhesive 15 should be about 50–100 grams per ½ inch for a low tack application and about 200–250 grams per ½ inch high tack application. The low tack is used primarily when preparing stencils, whereas the high tack is used when the adherence is intended to be permanent.

The release coating 16 can also consist of a variety of materials. In the preferred embodiment, however, the coating 16 is a silicone coating applied to the top surface of the second or support layer 11.

Each of the embodiments illustrated in FIGS. 1–4 also includes an associated third or transfer film layer. The primary function of this third layer is to facilitate the transfer of the cut-out figures, or the stencil as the case may be, to the desired medium. In the embodiment of FIG. 2, this third or transfer layer is illustrated by the reference numeral 12 and is disposed adjacent to the side of the first layer 10 opposite that of the second layer 11. In this particular embodiment, the third layer 12 must be constructed of a generally flexible, hard and elastic material which enables it to be stretched without being cut during application of the cutting force. In FIG. 2, the third layer 12 is utilized to transmit the cutting force of the cutting die to the first layer 10 to cut the first layer 10 into the desired characters or figures. The material from which the third layer 12 in FIG. 2 is constructed is a material such as a polyester or polyethylene. Although this layer 12 of FIG. 2 can be constructed of a variety of materials, it must have the necessary flexibility, elasticity and toughness to prevent it from being cut by a cutting force of less than 250 pounds per linear inch in accordance with the cutting force test previously described.

In the embodiment of FIG. 2, the surface of the third layer 12 adjacent to the first layer 10 is provided with a low tack adhesive layer 17 to facilitate removal of portions of the first layer 10 from the second layer 11. In such embodiment, the first layer 10 is provided with a release coating or surface 18 to allow removal of the third layer 12 after the cut-out figures have been secured to the desired medium. The adhesive coating 17 can be any common low tack adhesive such as, for example only, those having a vinyl, acrylic or urethane base. The release coating 18 can be any common release coating such as silicone, teflon or fluorocarbons, or can in some cases be nothing more than the top surface of the first layer 10. In the preferred embodiment, the adhesive 17 has a tack of less than about fifty grams per one-half inch as measured by the test described above.

Figure 3:
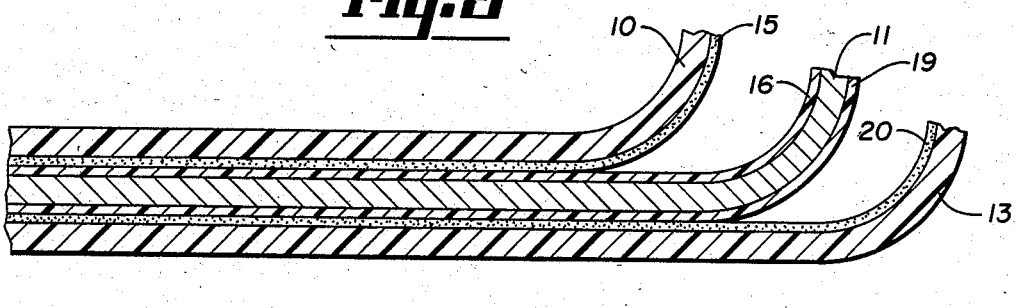
FIG. 3 is a sectional view showing a further alternate embodiment of the laminated tape of the present invention.
Figure 4:
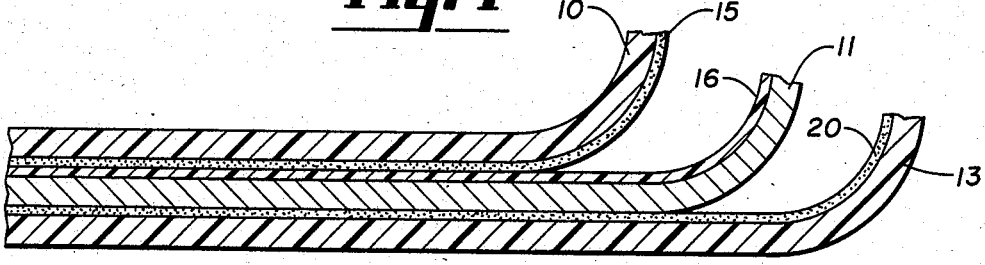
FIG. 4 is a sectional view showing a further alternate embodiment of the laminated tape of the present invention.

In the embodiments of FIGS. 3 and 4, the third layer or transfer tape is designated by the reference numeral 13. In these embodiments, the third layer 13 is disposed adjacent to the surface of the second layer 11 opposite that of the first layer 10 and remains in this position during the cutting procedure. As will be described in greater detail below, after the cutting procedure, the third layer transfer tape 13 is removed and placed adjacent the first layer 10 to transfer the cut-out figures from the first layer 10 to the desired medium. The third layer or transfer tape 13 illustrated in FIGS. 3 and 4 can be constructed of a variety of materials since its only function, in these particular embodiments, is to facilitate the transfer of the cut-out characters from the first layer 10 to the desired medium. Preferably, however, the third layer 13 in the embodiments of FIGS. 3 and 4 is constructed of a polyester, polypropylene, acetate, polyethylene or paper base material.

Similar to the third or transfer layer 12 of FIG. 2, the third layer 13 of FIGS. 3 and 4 is provided with a low tack adhesive coating 20. This coating 20 has generally the same characteristics and tack as the coating 17 of FIG. 2 and performs the same function of facilitating removal of cut-out portions of the first layer 10 from the second layer 11. In the embodiment of FIG. 3 a release liner or coating 19 is provided on the surface of the second layer 11 adjacent the third layer 13, while in the embodiment of FIG. 4, the release characteristics are inherent in the second layer 11 itself.

Figure 5:
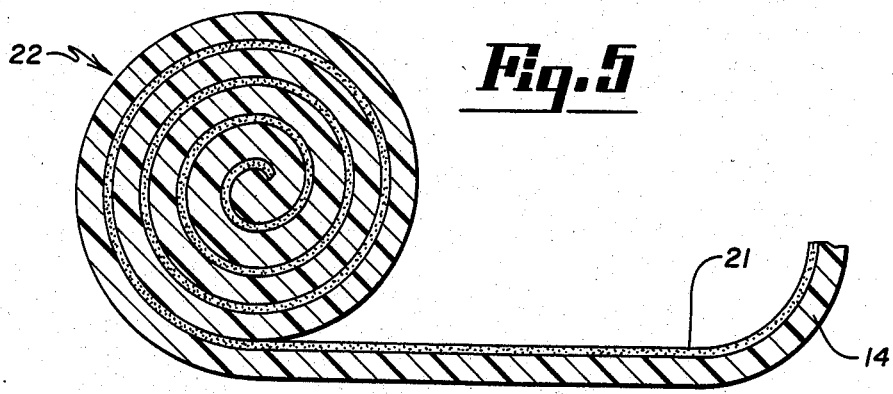
FIG. 5 is a sectional view of one embodiment of the transfer tape usable with the laminated tape illustrated in FIG. 1.

In the embodiment illustrated in FIG. 1, the third layer or transfer tape is provided from a separate spool 22 as shown in FIG. 5 and designated by the reference numeral 14. When using the laminated tape of FIG. 1 and the third layer or transfer tape 14 of FIG. 5, the transfer tape 14 is utilized in the same manner as the transfer tape 13 in FIGS. 3 and 4 after the cutting procedure has been completed. Also, similar to the third layer or transfer tape 13 of FIGS. 3 and 4, the sole purpose of the transfer tape 14 is to assist in transferring the cut-out figures from the first layer 10 to the desired medium. Accordingly, it can be constructed of the same material as the third layer 13 of FIGS. 3 and 4. The transfer tape 14 in FIG. 5 is also provided with a low tack adhesive 21. This adhesive has generally the same characteristics and tack as the adhesive coating 17 of FIG. 2 and the adhesive coating 20 of FIGS. 3 and 4 and performs the same function of facilitating removal of cut-out portions of the first layer 10 from the second layer 11.

Figure 10:
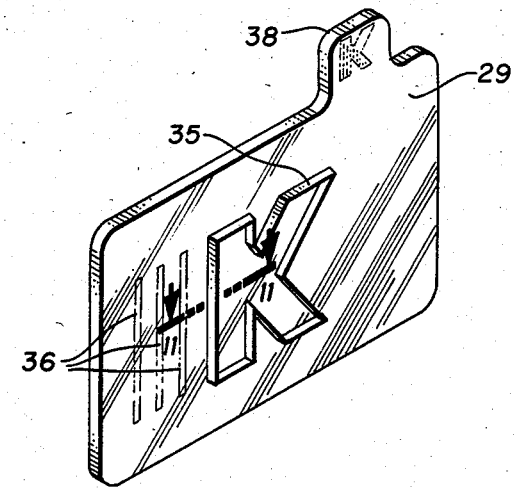
FIG. 10 is a pictorial view of the cutting die in the form of a lettering chip.

In the cutting procedure associated with the laminated tape of the present invention, the first layer 10 of FIGS. 1-4 is cut by a cutting die in the form of the lettering chip 29 illustrated in FIG. 10. As shown in FIG. 10, and also in FIG. 11, the cutting die includes a generally wedge-shaped, continuous cutting ridge 35 having a continuous cutting point or edge 39 (FIG. 11). In the preferred embodiment, this lettering chip 29 is constructed of a high impact molded plastic material such as Plexiglass DR 61K manufactured by Rohm & Haas Company of Philadelphia, Pa. It is contemplated, however, that different types of materials can also be used. The lettering chip 29 includes a tab 38 to facilitate handling the chip 29 and a plurality of alignment indicia 36 to facilitate proper alignment of the character or figure 35 to be cut.

Figure 9:
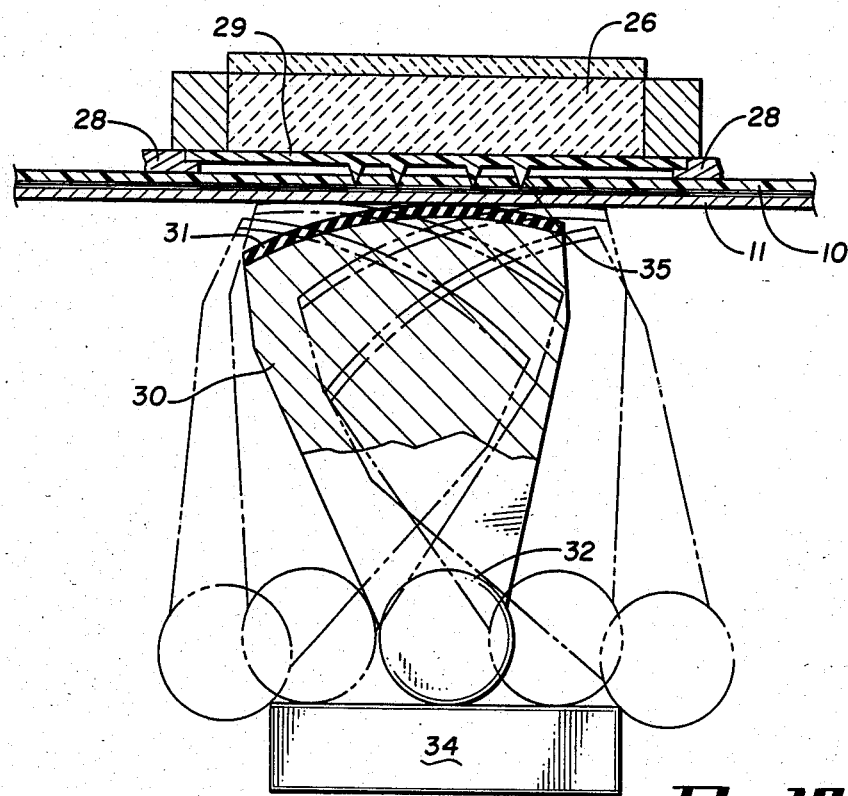
FIG. 9 is an elevational view, partially in section, showing the mechanism for applying the cutting force to the laminated tape.

FIG. 9 illustrates one embodiment of a means for applying a cutting force to the lettering chip 29. A structure of this type is known in the art. In general, however, it includes a pair of support rails 34 (only one of which is illustrated in FIG. 9) and a generally wedge shaped force generating segment rotatably mounted near its pointed end to a roller member 32 adapted for rolling movement along the support rails 34. The upper, curved surface of the wedge-shaped segment 30 includes a pad 31. This pad may be constructed of a rubber or plastic material with some resiliency. In the preferred embodiment, the pad is a urethane pad having a hardness of approximately 61-64 Shore C. The device illustrated in FIG. 9 also includes a pair of chip alignment members 28, 28 and a cutting force resisting means 26. As shown, the cutting die or lettering chip 29 is positioned within the alignment and retaining tabs 28, 28 and the segment 30 is caused to roll against the bottom surface of the lettering chip 29 containing the cutting ridge 35 by moving the roller 32 from one end of the support rails 34 to the other. During the cutting procedure, the laminated tape comprising at least the first layer 10 and the second layer 11 is disposed between the urethane pad 31 and the bottom surface of the lettering chip 29. Then, as the roller segment 30 is rolled from one end to the other, the cutting force is applied between the urethane pad 31 and the lettering chip 29. This cutting force is sufficient to cut only the first layer 10, while leaving the second layer 11 uncut.

It should be noted that in FIG. 9 the laminated tape being cut is similar to that of FIG. 1. If the laminated tape of FIG. 2 is cut, the cutting force applied to the cutting ridge 35 is transmitted through the third layer 12 (FIG. 2) to the first layer 10 which is then cut. If the embodiment of FIGS. 3 and 4 is cut, the cutting ridge 35 cuts only the first layer 10 without cutting either the second layer 11 or the third layer 13.

After the cutting procedure, the laminated tape is then removed from the cutting apparatus and the cut-out figures or characters from the first layer 10 are transferred to the desired medium. This transfer procedure is illustrated best in FIGS. 6, 6a, 7 and 8. FIG. 6 shows a section of the laminated tape of FIG. 1 with the letters or characters having been cut-out. To transfer the cut-out letters to the desired medium, the portion of the layer 10, except for the cut-out letters, is first removed from the base or second layer 11. This is accomplished by separating the layers 10 and 11 at a corner and then pulling the layer 10 off. When this is completed, the figures 24 remain on the layer 11 as illustrated in the lower half of FIG. 6a. A strip of the third layer of transfer tape 14 (FIG. 5) is then cut and placed onto the top surface of the remaining cut-out figures 24 as illustrated in FIG. 6a with the low tack adhesive 21 in engagement with the top layer 10 of the cut-out figures 24. After having been placed onto the cut-out figures 24 of the first layer 10, the transfer tape 14 is peeled back to remove the figures 24 from the second layer 11. Although the adhesive 21 on the transfer layer 14 is a relatively low tack adhesive, it is sufficient to remove the cut-out figures 24 because of the release layer 16 on the layer 11. If the laminated tape of FIG. 2 is used, the third layer 12 is simply peeled back in the same manner so as to remove the cut-out figures 24 from the layer 11. If the laminated tape of either FIGS. 3 or 4 is used, the transfer tape 13 must first be removed from the layer surface of the layer 11 and then used to remove the cut-out figures 24 in the manner described above.

Following the removal of the cut-out letters or figures 24, the resulting transfer tape 14 includes only the cut-out letters 24 as shown in FIG. 7. As illustrated, the cut-out figures 24 are aligned on the tape 14 with their adhesive side facing outwardly. To apply these cut-out characters 24 to the desired medium, the transfer tape 14 is simply aligned in the desired position as illustrated in FIG. 8 and placed down in that position so that the bottom surface of the cut-out letters 24 which contain the aggressive adhesive 15 secures to the desired medium 25. The transfer tape 14 which contains the relatively low tack adhesive is then removed, thereby leaving the cut-out letters 24 properly positioned on the desired medium 25.

Although the description of the preferred embodiment has been quite specific, it is contemplated that various changes could be made without deviating from the spirit of the present invention. Accordingly, it is intended that the scope of the invention be dictated by the claims rather than by the description of the preferred embodiment.

I claim:

1. A laminated tape for preparing figures of desired shape from one layer of the laminated tape for application to a desired medium comprising:
 a first film layer comprised of a relatively soft and flexible material capable of being cut by an elongated cutting ridge of a cutting die defining the figure of desired shape, said first film layer having a top and a bottom face and being constructed of a material having a tensile strength of no greater than about 1000 pounds per square inch, said first film layer further being at least 0.001 inches thick and being constructed of a material capable of being cut by a plastic cutting ridge against a plastic or rubber cutting pad with a cutting force of no more than about 250 pounds per linear inch of said cutting ridge; and
 a second film layer for supporting said first film layer, said second film layer having a top and bottom face, said top face of said second film layer disposed in face-to-face relationship with respect to the bottom face of said first film layer, said bottom face of said first film layer having an adhesive coating for selectively securing said first film layer to said top face of said second film layer, said top face of said second film layer having properties permitting the selective removal of said first film layer from said second film layer and said top face of said first film layer being free of any adhesive layer.

2. The laminated tape of claim 1 wherein said first film layer is constructed of a material having a tensile strength of no greater than about 500 pounds per square inch.

3. The laminated tape of claim 1 wherein said first film layer is constructed of a urethane material.

4. The laminated tape of claim 3 wherein said urethane material of said first film layer has an isocyanate to hydroxyl equivalency ratio of between about 0.7 and 0.9.

5. The laminated tape of claim 4 wherein said urethane material of said first film layer has an isocyanate to hydroxyl equivalency ratio of about 0.8.

6. The laminated tape of claim 1 wherein said top face of said first film layer constitutes the outermost surface of said laminated tape for exposure directly to said cutting die.

7. The laminated tape of claim 6 including a third film layer disposed adjacent to said bottom face of said second film layer, said third film layer including a second adhesive coating on its face disposed adjacent to said bottom face of said second film layer.

8. The laminated tape of claim 7 wherein said third film layer is removable from said second film layer for positioning onto said first film layer with said second adhesive coating in engagement with the top face of said first film layer.

9. The laminated tape of claim 1 consisting only of said first film layer and said second film layer.

10. The laminated tape of claim 1 wherein said first film layer is constructed of a material capable of being cut by said cutting ridge with a cutting force of between about 125 and 175 pounds per linear inch of cutting ridge.

11. A laminated tape comprising first and second film layers and being useful in the preparation of figures of desired shape from said first film layer by cutting the outline of the figure of desired shape from said first film layer and then subsequently removing said figure of desired shape from said second film layer, said first and second film layers being secured to one another in face-to-face relationship by an adhesive coating applied to said first film layer, said second film layer having properties permitting the selective removal of said first film layer therefrom, said first film layer comprised of a relatively soft and flexible material capable of being cut by an elongated cutting ridge of a cutting die defining the figure of desired shape and having a tensile strength of no greater than about 1000 pounds per square inch, said first film layer further being at least 0.001 inches thick and being constructed of a material capable of being cut by a plastic cutting ridge against a plastic or rubber cutting pad with a cutting force of no more than about 250 pounds per linear inch of said cutting ridge.

* * * * *

UNITED STATES PATENT AND TRADEMARK OFFICE
CERTIFICATE OF CORRECTION

PATENT NO. : 4,584,220
DATED      : April 22, 1986
INVENTOR(S): Kenneth M. Melbye It is certified that error appears in the above-identified patent and that said Letters Patent is hereby corrected as shown below:

Column 3, line 51, delete the word "nut" and insert --not--.

Column 9, line 12, delete the word "layer" and insert --lower--.

Signed and Sealed this

Twenty-third Day of September 1986

[SEAL]

Attest:

Attesting Officer

DONALD J. QUIGG

Commissioner of Patents and Trademarks